(12) United States Patent
Conti

(10) Patent No.: US 7,335,027 B1
(45) Date of Patent: Feb. 26, 2008

(54) METHOD OF PRODUCING SIMULATED HUMAN TISSUE USING CANDY CORES

(76) Inventor: James C. Conti, 105 E. 4th St., Galena, MO (US) 65656

( * ) Notice: Subject to any disclaimer, the term of this patent is extended or adjusted under 35 U.S.C. 154(b) by 1060 days.

(21) Appl. No.: 10/649,587

(22) Filed: Aug. 27, 2003

Related U.S. Application Data

(60) Provisional application No. 60/405,887, filed on Aug. 27, 2002.

(51) Int. Cl.
*G09B 23/28* (2006.01)

(52) U.S. Cl. ...................................... 434/267

(58) Field of Classification Search ................ 434/262, 434/267, 268, 270, 272, 273; 426/89, 90, 426/91, 104; D1/106–109
See application file for complete search history.

(56) References Cited

U.S. PATENT DOCUMENTS

| | | | |
|---|---|---|---|
| D69,277 S * | 1/1926 | Josephson | D1/104 |
| 2,556,043 A | 6/1951 | Roucka | 434/268 |
| 4,106,219 A * | 8/1978 | Schneider et al. | 434/274 |
| 4,312,826 A * | 1/1982 | Colvin | 264/221 |
| 4,451,416 A * | 5/1984 | Burtscher | 264/46.6 |
| D274,859 S * | 7/1984 | Harris et al. | D1/104 |
| 6,283,762 B1 * | 9/2001 | Wiggins | 434/236 |
| 6,471,519 B1 * | 10/2002 | Biermann et al. | 434/274 |
| 6,511,325 B1 * | 1/2003 | Lalka et al. | 434/272 |
| 6,843,145 B2 | 1/2005 | Jaszczak et al. | 73/866.4 |
| 2004/0071831 A1 * | 4/2004 | Barba | 426/91 |

* cited by examiner

*Primary Examiner*—Kurt Fernstrom
(74) *Attorney, Agent, or Firm*—Jonathan A. Bay

(57) ABSTRACT

A lost candy method for producing polymeric mock human tissue that has to meet an exacting specification comprise producing a batch of cores of a candy material from a sugar composition, and then coating such cores repetitively in pre-polymer material to build up sufficient thickness estimated to be short of or otherwise meeting the specification. After allowing completion of the polymerization process, then testing one polymerized member of the batch for if it meets the specification. If it does, then the remaining members can be tested for it they do too. If not but if things can be remedied by adding additional thickness, then returning to the step of coating with the remaining members of the batch. Otherwise, then returning to the beginning by of producing anew a fresh batch of cores of the candy material, and then coating such repetitively in said pre-polymer material except fewer times as originally.

21 Claims, No Drawings

US 7,335,027 B1

METHOD OF PRODUCING SIMULATED HUMAN TISSUE USING CANDY CORES

CROSS-REFERENCE TO PROVISIONAL APPLICATION(S)

This application claims the benefit of U.S. Provisional Application No. 60/405,887, filed Aug. 27, 2002, which provisional application is incorporated herein in full by this reference.

This application is concurrently filed with commonly-invented, commonly-owned co-pending U.S. patent application Ser. No. 10/649,589, entitled "Test Apparatus Providing Pulsatile Flow Service for Test Samples," and which is based on U.S. Provisional Application No. 60/406,282, filed Aug. 27, 2002, all the foregoing which are incorporated herein in full by this reference.

BACKGROUND AND SUMMARY OF THE INVENTION

The invention relates to products produced by coating or casting processes that utilize cores or molds. This further includes processes in which a core and mold are utilized together to define a cavity in which product is formed. More particularly the invention relates to a lost candy method with such cores or molds in the production of such products. It also relates to an inventive candy-like composition for such core or mold material.

For example, consider products produced from coating processes that utilize cores. A core might be dipped in (or otherwise coated by) an un-set product-material, one or more times to develop one or more coats (or layers) of un-set material. After desired number of layers have been achieved (and the product material completely sets or cures), the core is removed (or eliminated) to yield the "product." In general, the core's exterior shape gives the product its interior shape.

The foregoing assumes a core produced of a uniform material. An alternative to that is a sub-core that is coated with a skin material. The skin material provides the desired outer shape of the product. After the product is produced on this skin, then the skin material might be melted and/or dissolved away which, among other things, frees up the sub-core for extraction from the end product. The sub-core is preferably sized suitably small to navigate out of the end product without harming it because presumptively the end product is more fragile than the sub-core. To date a preferred sub-core material includes without limitation a proprietary modeling material of the Z Corporation in St. Louis, Mo., used in a stereo lithography procedure for producing complex-geometry figurines with exacting detail. Alternatively, complex-geometry sub-cores can be produced among other ways by sintering procedures when economy is more important.

In contrast, for projects with molds, an original layer of uncured product-material might be poured into and swished around the inside walls of the mold until it partially or completely sets up (or cures) sufficiently as to allow application of additional layers. After the final product shape is obtained, the mold is taken off (or otherwise eliminated) to yield the "product." In this example, the mold's interior shape gives the product its exterior shape.

Additionally, product might be produced by casting (eg., pouring) the un-set product-material into a cavity defined between a mold and core.

There is a need for products made out of optically clear silicone or polyurethane that have precisely defined dimensions, as well as precisely defined mechanical properties. For example, there is a need for mock human-tissue tubular products that have defined change(s) in dimension against changing internal pressure. More particularly, trials with the inventive method have successfully produced models or replications of coronary artery bifurcations. Also, other trials have successfully produced models of arteries with aneurysm.

Routine trial and error with the inventive method would just as easily make replications of liver bile ducts, ventricular chambers, or any three-dimensional object that requires precisely-defined dimensions and mechanical properties.

Other fields of use or applications for end products produced in accordance with the invention include not only the utilization of such end products to test or qualify surgically-administered devices in such replicated anatomy (rather than having to test or qualify such surgically-administered devices in animal models, cadavers, or even humans) but also for demonstration purposes for companies that are selling materials or devices associated with use on, in or around these various arteries or organs. There is also great application for testing deployment of implantable devices into these inner cavities. Further possibilities include without limitation the training of physicians in use of delivery catheters or suturing.

It is known in the prior art how to produce straight tubes of constant diameter. However, the production issues with straight tubes are not nearly as complicated as with products of more complicated geometries. For one reason, it is fairly easy to remove cores out of and/or molds off of straight tubes. Yet in regards of the production of products that have complicated geometries, such as sinuous curves or large flared/hollowed-out regions in the middle of the product, the prior art is deficient in remedying the problems of successfully removing the molds or extracting the cores without compromising the integrity of the product.

That is, if the intended design is a replication of a diseased artery, as one horribly deformed by aneurysm, creating a core might not be so much a problem as separating the core from the cured replication without stretching the mock arterial walls on either side of the mock aneurysm to the point of harming the replication.

More problematical is the acceptability of a core or mold material which would allow use with specialty silicones. The preferred silicones are platinum catalyzed and are desired for producing optically clear products. Most of the catalysts used (platinum, in particular) are easily fouled by such "contaminants" as sulfur, which is contained in most living materials. Hence this excludes wax among other materials as a suitable core material. Again, wax contains matter in it which fouls the platinum-containing catalyst used to polymerize such silicones.

It is an object of the invention to overcome the shortcomings of the prior art.

These and other aspects and objects are provided according to the invention in a method of producing elastic mock human tissue products, such as arterial vessels and the like. The inventive method comprises various of the following steps. Preferably at an original time a product specification is specified, it comprising perhaps dimensions and a coefficient of elasticity. This coefficient of elasticity is some descriptive factor or measure of elastic behavior in response to a stimulus. It is additionally preferred if some test is specified which measures or determines whether such a coefficient or factor is satisfactorily met in accordance with the specification. It is further preferred if there is some original choice over the material that the produce will be produced out of. It is fairly assumed that such a material will be a suitable polymer. Accordingly, it is preferred if a polymer is specified of the type which can be obtained by a pre-polymer and polymerizing agent therefor.

Given the foregoing, the method in accordance with the invention further includes producing a batch of hard sugar-candy cores according to the specified dimensions. Small tooling is attached to the cores such as fine diameter metal hanger rods or the like. The cores are preferably dipped by the tooling into a mix of the pre-polymer and polymerizing agent in order to encapsulate the cores entirely and, for insurance, at least a small overlapping portion onto a margin of the tooling. Next the dipped cores-and-tooling are partially cured concurrently with three dimensional rotation thereof.

Further curing of the rotated dipped cores-and-tooling is preferably achieved by immersion in a bath hotter than the melting point of the hard sugar-candy cores. To see if the batch of works-in-progress meet the specification, it is preferably at this stage to select one member of the batch for testing by the specified test. This entails breaching the polymer encapsulation to melt and/or dissolve out the hard sugar-candy core. If the selected member meets the test, then the rest of the batch can be retrieved as presumptively finished product (although it is desirable to test each one for meeting the specification in order to ensure 100% quality). In contrast, it the said selected member fails but only because of insufficient polymer thickness, then the rest of the batch can be returned to the step of dipping described previously.

An example of the coefficient of elasticity has it a corresponding a percent enlargement in response to a specified pressure increase. To be particular, perhaps the product specification recites that for tubular products having an inside diameter, and the coefficient of elasticity corresponds to a 7% to 12% increase in inside diameter in response to a 100 mm of mercury pressure increase.

It is optional that the polymer might be formed by either a solvent-based pre-polymer material or a catalyst and pre-polymer combination, or both. There are available for this purpose both solvent-based urethanes or a platinum-catalyzed silicones.

The hard sugar-candy cores are produced from substantially sugar and water. It is desirable that hard sugar-candy cores have a hardness ranging from about that of glass to that of softer caramel, but nevertheless are characterized by nearly uniform solidness or alternatively the nearly complete absence of reversion into sugar crystals or sugar powder. An example composition might comprise about four (4) volume measures of sucrose to one (1) volume measure of water, and then optionally less than two percent (2%) volume measure of the whole of "anything else." Such "anything else" might be either corn syrup or potassium tartrate, or both.

The step of partially curing the dipped cores-and-tooling concurrently with three dimensional rotation thereof preferably further comprises doing so in warm air, as well as doing so over several hours. The step of further curing the rotated dipped cores-and-tooling by immersion in a bath hotter than the melting point of the hard-candy sugar cores preferably further comprises a bath of warm water at a temperature of at least about 10° C. (18° F.) greater than the melting point of the hard sugar-candy. This additionally preferably further comprises weighting the rotated dipped cores-and-tooling for near-neutral buoyancy in such a bath.

A number of additional features and objects will be apparent in connection with the following discussion of preferred embodiments and examples.

DETAILED DESCRIPTION OF THE PREFERRED EMBODIMENTS

The lost candy method in accordance with the invention for cores and molds utilizes a composition of sugar (eg., sucrose) likewise in accordance with the invention as the preferred core or mold material. One reason for the sugar composition's preference here is that it is at least a sulfur-free compound. Moreover, such a sugar composition is easily handled, it can be used to make all sorts of complicated three-dimensional shapes, and it is easy to melt and/or dissolve out. Sugars have the properties of dissolving readily in water and crystallizing in rather hard crystals. Sugars include without limitation sucrose (eg., common table or cane sugar), glucose (and especially the ubiquitous D-glucose, also known as dextrose and grape sugar), fructose (fruit sugar), maltose (malt sugar), and so on.

In this disclosure, the inventive sugar composition is alternatively referred to as a "candy" merely for the convenience of descriptive terminology but otherwise does not independently limit the invention in view of this disclosure as a whole.

More preferential is a formulation of this "candy" that contains low levels of potassium tartrate and corn syrup. The foregoing results in a core or mold object that is solid, stable, and easily handled.

Just as cores (or molds) are used to produce end-products, it is further preferred if "dies" are used to produce such cores (or molds). To digress for a moment on matters of terminology, a "die" is comparably a 'mold' too except "die" in this written description refers to the thing which produces the candy core or mold. Thus the candy core or mold is more accurately an intermediate work-product used in the attainment of the end-product. Such an end-product might be for example an optically clear silicone replication of a coronary artery or the like.

When constructing dies, it pays to bear in mind the following. That is, in order to produce an end-product that has precise inner dimensions (precision to about 50 microns), things are best served if the die is a rigid or hard material that receives a surface treatment (and/or is treated with non-contaminating release-promoting materials) that will afford simple release of the candy core of mold from the hard die. A preferred material for constructing dies includes without limitation aluminum. A preferred release agent includes without limitation a thin coating of canola oil (eg., Pam® brand, which is canola oil and an aerosol propellant, perhaps ethyl alcohol).

A further way to produce a core (or mold) of precise dimensions is to create a sub-core. Nowadays there are elaborate technologies which produce small figurines in complicated geometries from talc-like powder. This includes without limitation stereo lithography procedures for the most exacting detail, or else sintering procedures when economy is more important. A preferred sub-core material includes without limitation a proprietary modeling material of the Z Corporation in St. Louis, Mo., for stereo lithography procedures. Preferably the sub-core is reusable but on the other hand it may be considered a use-once item. In any event, the sub-core is given a skin of the candy material in accordance with the invention. The skin might be a layer as thin as between one and three mm (40 and 120 thousandths of an inch). After the end-product is finally cured or hardened on the candy skin, preferably the candy is melted or dissolved and drained away. This leaves the sub-core loose inside the end-product which, if the sub-core is designed sufficiently under-sized just properly, can be navigated out of the fragile end-product without harming it. Again, the sub-core might be re-used but then also it might be simply discarded after one use.

Given the foregoing, the lost candy method in accordance with the invention preferably utilizes the production of a candy-like material substantially comprising sugar and water, as well as comprising low levels of potassium tartrate and corn syrup. These ingredients are heated to relatively precise temperatures for controlled (eg., short) periods of time and then delivered into surface treated aluminum dies. After cooling for a period of time, the candy mold or core is released. It ought to be reminded again that, with the terminology "die" and "mold" what is being referred to are two different things:—one is the aluminum die into which the candy material is poured into or injected, and the second is the candy core (or mold) which is removed upon hardening from the aluminum die.

An example candy composition includes without limitation the following starting ingredients, ie.:

approximately 78.7 volume percent (eg., 2 cups) of sucrose;
approximately 19.7 volume percent (eg., ½ cup) of water;
approximately 0.4 volume percent (eg., ½ teaspoon) of potassium tartrate; and
approximately 1.2 volume percent (eg., ½ tablespoon) of corn syrup (eg., light Karo® brand).

In practice, the foregoing serves as a guidepost rather than a rigid recipe because the actual recipe is changed from case to case to meet the requirements. However, it is generally the practice that the potassium tartrate and corn syrup are added in low concentrations.

In use, the ingredients are mixed and stirred over heat. Sucrose melts perhaps at 75° C. (~170° F.). However, preferably the recipe is brought up to between about 130° C. and 145° C. (~265° F. and ~290° F.), and then used immediately. Once the recipe is brought to temperature, there is perhaps a fifteen minute window to use the recipe or else it will change for the worse, becoming unusably thick. Hence at this time it is poured into the dies. The die(s) with their candy contents are cooled down in a vented drying oven.

In general, it is most preferred if a candy core is hard and glassy, something like a Lollipop®. It is an object to avoid the recipe resulting in the sugar re-crystallizing into sugar crystals (like table sugar) or otherwise appearing like powdered sugar. Such sugar crystals or powdered sugar fail to give the core (or mold) a continuous skin and crumble off of or disintegrate easily away from the core (or mold). Some complex shapes are characterized by sharp protuberances. These prove problematical. It is often the case that a major part of the candy core has a desirable hard glassy body while the protuberances provide localized problems of disintegration by either being crystalline sugar or powdered sugar. It is a failure when that happens. A fresh batch of candy must be prepared from the starting ingredients, except in changed amounts to result in a softer candy. That way, whereas perhaps a major part of the candy core will be softish like caramel, at least the critical protuberances will be hard and glassy like a Lollipop®.

Experience through trial and error, or simply just trial and error, determines what the correct proportions of the ingredients should be in any one case. It is an object of the invention to produce the candy as hard as possible. However, the more the recipe is changed to make the candy harder the more likely it will all be re-crystallized sugar crystals or powder when done. At times, the proportions of the ingredients have to be mixed such that even though a major portion of the core's body is fairly soft, at least the sharp edges will be suitably glassy hard and not disastrously revert into crystals or powder.

The second step of the process is the actual dipping of the candy core (or mold) into special formulations of polymers (or perhaps involving a pouring or casting step for molds). For convenience sake in this description, it is assumed that there are three general classes of moldable polymers. One is a class of thermoplastics, two is a class of solvent-based pre-polymer materials, and three is a class of catalyst and pre-polymer combinations.

With thermoplastics, a finely divided grind of raw material is heated until flowable and then molded. When the material cools it sets up preferably as a uniform unit.

Solvent-based pre-polymer materials are obtained in containers or packaging which seals in the solvent until use. As soon as a solvent-based pre-polymer material is applied in a use environment, the solvent is afforded opportunity to start the polymerization process. The evaporation of the solvent leaves behind the cured polymer end-material. Common examples include the room-temperature vinyls (eg., RTV's) including acetoxies (eg., smells like vinegar) and alkoxies (ie., non-acidic). In addition, there are also solvent-based urethanes that are especially useful for the invention. These include the popular BIOMER® product of the Johnson & Johnson Company, Brunswick, N.J., which might be the leading product used for mock human tissues such as mock arteries and like.

Catalyst and pre-polymer combinations are obtained as separate components that are mixed together on the occasion a user wants to produce a polymer. BIOMER® aside, among this class of polymers the industry for mock human tissues such as mock arteries and the like seems preferential to platinum-catalyzed silicones.

A pre-polymer that is polymerized by a catalyst can be further combined with a solvent. The solvent slows down the catalyst-driven reaction that produces (eg., cures out) the end-result polymer. It is believed that solvent merely spaces apart the catalyst and pre-polymer components for a while, at least until the solvent substantially vaporizes down to a low concentration, after which the catalyst and catalyst-driven pre-polymer components sufficiently interact to generate the end-result polymer.

In contrast to what the larger industry prefers in the way of BIOMER®, the inventor prefers producing mock human tissue products such as arterial vessels and the like by platinum-catalyzed silicones, perhaps in which instances the catalyzed reaction is slowed down some measure by the mixing in of solvent. The foregoing affords as good as opportunity at producing mock human tissue such as arterial vessels and the like as BIOMER®. Either way, the end goal is to produce desirable end-objects of precise dimension (in the case of cores, inner dimension), optical clarity, and tunable mechanical properties.

Optical clarity is desirable for observation if not video data recordation. Optical clarity is a qualitative factor. Many elastic polymers which are otherwise candidate materials because of elasticity properties are cloudy to opaque. Customers of human tissue products such as mock arterial vessels and the like are choosy over optical clarity. It looks clean. It looks like meaningful data can be observed despite that most data-logging sensors are blind and work on ultrasound (eg., flowmeters) or otherwise. Nevertheless, it is a bonus with customers if their mock human-tissue products are optically clear. More important from a designer point of view, it is preferred if the mock human-tissue products can be produced in ways which allow better replication or simulation of the real-life human tissue which they are designed to "mock" (ie., simulate, replicate, or behave like).

To date, trial and error is the preferred method or ensuring that end-product meets specification. Briefly, a batch of end-products are produced to a chosen stopping point, one member of the batch is selected for removal and testing to see if the specification has been met, if not then that one member is a loss and the remaining members are further processed to converge upon meeting the specification (if possible). This ongoing effort will be more particularly described below. What is more important is, not how to predict accurately in advance what way to start in order to get the best product in one trial but, that the process is iterative and allows successive trials to converge upon the specification as closely as possible. With the end-products, cost is not paramount, performance is. Hence it is an advantage of the process that the mechanical properties are tunable by trial and error.

For example, consider the production of mock arteries produced by dipping a core in accordance with the invention in a selected pre-polymer composition. Generally it is true that the dipping process will require several dipping steps, each followed by three-dimensional rotation of the dipped core (or mold) for varying periods of time until the solvent inherent in the chosen (eg.) platinum-catalyzed silicone evaporates or is otherwise partially driven out. Once that happen, the residue platinum-catalyzed silicone material is at least partially if not completely set to the extent as to afford a succeeding dipping step. At this stage in the process, so far what has been attained are the properties that are achievable by a first dipping step. Experience might suggest that good results won't be achieved until the earliest of, for example's sake, five dipping steps.

In practice, if a producer desires to produce ten useful end-products which meet exacting specifications, the producer is wise to start a batch consisting of fifteen or more works-in-progress. That way, during the batch processing, the producer can remove one work-in-progress and test it for meeting the specification. If it fails, the producer can re-work the remaining works-in-progress of the batch to change their properties, and test again. By the foregoing, the producer has five works-in-progress to sacrifice for testing if the batch as a whole meets the specification.

This can be stated differently as follows. What is most desired is to produce end products which meet exacting specifications as to size and other mechanical properties such as percent (diametrical) enlargement given a pulse pressure input (eg, 100 mm step increase in pressure). Also, it is another complication that the product geometries are rather complex, given that the product is both mocking human tissue and more preferably mocking things like diseased human tissue such as an artery horrifically deformed by aneurysm. It pays to start with a batch of works-in-progress having surplusage. One member of the batch can be taken during the process and tested for meeting the specification. If the tested sample fails to meet the specification in a way that is remedied by coating the product thicker with more polymer, then this can be remedied. Even a fully cured work-in-progress with many solvent-based polymers or catalyzed polymers can be thickened further by re-dipping in pre-polymer material that is combined with its polymerization agent. By these processes, an end-product can be achieved which closely meets a pre-defined specification. On average, depending upon the size of the end-product, one to eight dips in a pre-polymer vat is sufficient to create an average product which meets its specification.

Generally, with a candy core in accordance with the invention, each dip is followed by three-dimensional rotation of the work-in progress so as to evenly distribute the pre-polymer mix on or around the candy core (or mold) while allowing the evaporation of the solvent (or curing activity of the catalyst). After the dipping is completed for a pause for testing (and the solvent furthermore moves out or the catalyst completes its activity), the batch of the works-in-progress are then delivered to a pre-curing oven held preferably at 35° C.±0.1° C. (~95° F.), during which time additional rotation is necessary so as to maintain the uniformity of polymer all around or within the candy core or mold. The time here varies depending upon the wall thickness and overall dimensions of the end-product. In general, it takes from nine to twelve hours.

During this dipping and curing process, it is especially desirable that all portions of the candy core (or mold), as well as the small tooling used to hold the core (or mold), are completely covered in pre-polymer/polymer. This is because during the next step in the process it is correspondingly desirable to continue promoting the steady maintenance of the shape of the end-product that was obtained from all the curing steps to this stage. This next step in particular is not recognized in general by the mock human tissue industry to date as an effective way to cure and, therefore, is probably preferential to the ability to produce such end-products in accordance with the invention, if not the key to facilitate meeting specification.

This inventive cure step is achieved by immersion of the not-fully-cured, pre-polymer/polymer coated candy core or mold (ie., "combined-formation") with tooling attached, into water held at a temperature of 80° C. to 85° C. (~175° F. to 185° F.). The combined-formation is held in this water bath for approximately two hours, during which time the final shape and mechanical properties of the end-product are set. The reason that the shape of the end-product is not lost at this time (since the candy may melt at about 75° C. or 170° F. or so) is that it appears that the candy expands slightly more than the polymer coating during this process. Hence the polymer work-in-progress is slightly internally pressurized during this bath setting or curing process. Also, the candy-and-polymer combined-formation is approximately the same density as water. Each individual unit of a candy-and-polymer combined-formation is literally buoyed up during the setting process.

In practice, it is helped if the near-neutral buoyancy is assisted by weighting. That is, small "S" hooks or the like are hung on the works-in-progress so that they bounce around in the bath. That way, the works-in-progress are induced to stand practically straight up in the bath, although free to bob around. Observers to this scene have likened it to a pool party. What appears to happen is an individual one of the candy-and-polymer combined-formations might originally start out with its "S" hook weight resting on the tank bottom, the remainder of the combined-formation buoyed upright and headed for the surface but for the weight that anchors it. Over time, small bubbles might form in pockets, and change the balance of things such that the individual unit (anchor and all) with attached bubbles is lighter than water, and bobs up to the surface. One individual unit might jostle with others at the surface (ie., it is this scene that observers call a 'pool party'), scraping off its bubbles until suddenly it is heavier than water and sinks again to the bottom, its weight being the only part landing.

Nevertheless, this bath curing process still affords workers opportunity to extract one member of the batch and test it for meeting the specification. It the tested member fails in a way which indicates that additional layers of pre-polymer/polymer materials are required, the remaining members of the batch can be removed from the bath and dipped anew in coating material to build up the layers on the works-in-progress sufficiently in the hopes of meeting the specification. The bath does not hurt the opportunity to dip the works-in-progress anew in pre-polymer materials.

As said previously, cost is not paramount, meeting the specification is. It is a practice that one-hundred percent of the works are tested for whether or not they meet the specification. In batch processing, certain works-in-progress are sacrificed to see if they, as representative of the batch as a whole, are close to meeting the specification. Generally this means that in the case of a sacrificial member of the batch, it is sliced at an upper and lower extreme to allow the melted candy flow out. Such a sliced member of the batch is immersed back into the warm bath to clean out the liquified candy. Then that member is tested for meeting the specification. If it fails, the remaining members of the batch might be recipients of a further coating of the pre-polymer/polymer material in an effort to meet specification. In contrast, once the first member of the batch meets the specification, the remaining members are sliced apart, the residual tooling or sub-core (if any) are removed from them, and then they are thrown back into the bath for a rinsing. Each one in turn is tested for meeting the specification or not. Again, it is an object of the invention that one-hundred percent of the end-products are tested for meeting the specification. It is a trial and error process.

Actual trials have found problem examples where holes in a given polymer-coating that surrounds a candy core have allowed leakage of the melted candy from the inside of the polymer coating. When this happens, it results in a collapse of the core and an unusable end-product since the inner walls of the uncured polymer stick to each other when the candy is gone.

Given the foregoing, one object of the invention is to attain product shapes that to date have been unattainable in the past. As mentioned above, the inventive method affords making devices of very precise inner (and/or outer) dimensions with very precise mechanical properties. A target mechanical property might be, say for a tubular end-product which measures about twelve-inches (~30 cm) long and has about a two-inch (~5 cm) inside diameter, an elastic property as follows:—ie., there is a 7% to 12% expansion of the inside diameter for a 100 mm mercury step increase of inside pressure over the outside pressure (the outside pressure typically being atmospheric pressure or close thereto). To date it is preferred to utilize trial and error for every batch in order to produce one (or more) product(s) from, eg., six or so dips, curing, testing to see if the target elasticity is achieved, and if not repeating with additional dipping cycles until the target specification is fairly well converged upon.

As mentioned, trials with the inventive method have successfully produced models or replications of coronary artery bifurcations, as well as model or mock arteries deformed by aneurysm. Routine trial and error with the inventive method would just as easily make replications of liver bile ducts, ventricular chambers, or any three-dimensional device that requires precisely-defined dimensions and mechanical properties.

Other fields of use or applications for end products produced in accordance with the invention include not only the utilization of such end products to test or qualify surgically-administered devices in such replicated anatomy (rather than having to test or qualify such surgically-administered devices in animal models, cadavers, or even humans) but also for demonstration purposes for companies that are selling materials or devices associated with use on, in or around these various arteries or organs. There is also great application for testing deployment of implantable devices into these inner cavities. Further possibilities include without limitation the training of physicians in use of delivery catheters or suturing.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A method of producing elastic mock human tissue products, comprising the steps of:
   specifying a product specification comprising dimensions and a coefficient of elasticity;
   specifying a test which measures whether said coefficient's specification is met;
   specifying a polymer obtained by a pre-polymer and polymerizing agent therefor;
   producing a batch of hard sugar-candy cores according to the specified dimensions and including tooling attached to the cores;
   dipping the cores by the tooling into a mix of the pre-polymer and polymerizing agent in order to encapsulate the cores entirely and, for insurance, at least portions of the tooling;
   partially curing the dipped cores-and-tooling concurrently with three dimensional rotation thereof;
   further curing the rotated dipped cores-and-tooling by immersion in a bath hotter than the melting point of the hard sugar-candy cores; and
   selecting one member of the batch for testing by the specified test and breaching the polymer encapsulation to melt and/or dissolve out the hard sugar-candy core;
   if said selected member meets the test, then retrieving the rest of the batch, if said selected member fails because of insufficient polymer thickness, returning the rest of the batch to the step of dipping.

2. The method of claim 1 wherein said coefficient of elasticity comprises a measure of percent enlargement in response to a specified pressure increase.

3. The method of claim 2 wherein said product specification includes an inside diameter, and said coefficient of elasticity comprises a 7% to 12% increase in inside diameter in response to a 100 mm of mercury pressure increase.

4. The method of claim 1 wherein said polymer is formed by either a solvent-based pre-polymer material or a catalyst and pre-polymer combination, or both.

5. The method of claim 4 wherein said polymer comprises either a solvent-based urethane or a platinum-catalyzed silicone.

6. The method of claim 1 wherein said hard sugar-candy cores are produced from substantially sugar and water.

7. The method of claim 6 wherein said hard sugar-candy cores have a hardness ranging from about that of glass to that of softer caramel and which is characterized by nearly uniform solidness or alternatively the nearly complete absence of reversion into sugar crystals or sugar powder.

8. The method of claim 6 wherein said hard sugar-candy cores comprise about four volume measures of sucrose to one volume measure of water, and then less than two percent volume measure of the whole of anything else.

9. The method of claim 8 wherein anything else comprises either of corn syrup or potassium tartrate, or both.

10. The method of claim 1 wherein the step of partially curing the dipped cores-and-tooling concurrently with three dimensional rotation thereof further comprises doing so in warm air.

11. The method of claim 1 wherein the step of partially curing the dipped cores-and-tooling concurrently with three dimensional rotation thereof further comprises doing so over several hours.

12. The method of claim 1 wherein the step of further curing the rotated dipped cores-and-tooling by immersion in a bath hotter than the melting point of the hard-candy sugar cores further comprises a bath of warm water at a temperature of at least about 10° C. greater than the melting point of the hard sugar-candy.

13. The method of claim 12 wherein the step of the step of further curing the rotated dipped cores-and-tooling by immersion in a bath of warm water at a temperature of at least about 10° C. greater than the melting point of the hard sugar-candy further comprises weighting the rotated dipped cores-and-tooling for near-neutral buoyancy therein.

14. A method of producing elastic mock human tissue products, comprising the steps of:
specifying a polymer obtained by a pre-polymer and polymerizing agent therefor that has desired elastic properties;
producing a hard sugar-candy core according to specified dimensions and including tooling attached to the core;
dipping the core by the tooling into a mix of the pre-polymer and polymerizing agent in order to encapsulate the core entirely and, for insurance, at least a portion of the tooling;
partially curing the dipped core-and-tooling concurrently with three dimensional rotation thereof;
further curing the rotated dipped core-and-tooling by immersion in a bath hotter than the melting point of the hard sugar-candy core; and
breaching the polymer encapsulation to melt and/or dissolve out the hard sugar-candy core.

15. The method of claim 14 wherein said polymer is formed by either a solvent-based pre-polymer material or a catalyst and pre-polymer combination, or both.

16. The method of claim 14 wherein said hard sugar-candy core is produced from substantially sugar and water.

17. The method of claim 16 wherein said hard sugar-candy core has a hardness ranging from about that of glass to that of softer caramel and which is characterized by nearly uniform solidness or alternatively the nearly complete absence of reversion into sugar crystals or sugar powder.

18. The method of claim 16 wherein said hard sugar-candy core comprises about four volume measures of sucrose to one volume measure of water, and then less than two percent volume measure of the whole of anything else.

19. The method of claim 18 wherein anything else comprises either of corn syrup or potassium tartrate, or both.

20. The method of claim 14 wherein the step of further curing the rotated dipped core-and-tooling by immersion in a bath hotter than the melting point of the hard-candy sugar core further comprises a bath of warm water at a temperature of at least about 10° C. greater than the melting point of the hard sugar-candy.

21. The method of claim 20 wherein the step of the step of further curing the rotated dipped core-and-tooling by immersion in a bath of warm water at a temperature of at least about 10° C. greater than the melting point of the hard sugar-candy further comprises weighting the rotated dipped core-and-tooling for near-neutral buoyancy therein.

* * * * *